United States Patent [19]

Logan et al.

[11] Patent Number: 4,634,532

[45] Date of Patent: Jan. 6, 1987

[54] ORTHOPHOSPHATE-CONTAINING DESALINATION SCALE INHIBITORS

[75] Inventors: Douglas P. Logan; Thomas E. Cornelius, III; Susan P. Rey, all of Coraopolis, Pa.

[73] Assignee: Calgon Corporation, Pittsburgh, Pa.

[21] Appl. No.: 780,044

[22] Filed: Sep. 25, 1985

Related U.S. Application Data

[63] Continuation-in-part of Ser. No. 606,049, May 12, 1984, abandoned.

[51] Int. Cl.$^4$ .............................................. C02F 5/10
[52] U.S. Cl. ........................................ 210/697; 203/7; 210/639; 210/698; 210/699; 210/701; 252/181
[58] Field of Search .................. 203/7; 210/638, 639, 210/652, 697, 698–701; 252/180, 181

[56] References Cited

U.S. PATENT DOCUMENTS

| | | | |
|---|---|---|---|
| 2,782,162 | 2/1957 | Liddell | 203/7 |
| 3,514,376 | 5/1970 | Salutsky | 203/7 |
| 3,578,589 | 5/1971 | Hwa et al. | 210/701 |
| 3,589,998 | 6/1971 | Rice et al. | 210/701 |
| 3,751,372 | 8/1973 | Zecher | 210/699 |
| 3,810,834 | 5/1974 | Jones et al. | 210/698 |
| 3,837,803 | 9/1974 | Carter et al. | 252/181 |
| 3,928,196 | 12/1975 | Persinski et al. | 210/701 |
| 3,992,318 | 11/1976 | Gaupp et al. | 252/181 |
| 4,105,581 | 8/1978 | Sexsmith | 252/181 |
| 4,209,398 | 6/1980 | Ii et al. | 422/17 |
| 4,223,120 | 9/1980 | Kurowsky | 210/701 |
| 4,297,237 | 10/1981 | Boffardi | 210/697 |
| 4,386,005 | 5/1983 | Kapiloff et al. | 210/701 |
| 4,446,028 | 5/1984 | Becker | 210/697 |

FOREIGN PATENT DOCUMENTS

| | | | |
|---|---|---|---|
| 854151 | 10/1970 | Canada | 134/39 |
| 8302628 | 8/1983 | PCT Int'l. Appl. | |
| 82100122 | 8/1983 | PCT Int'l. Appl. | |

*Primary Examiner*—Peter Hruskoci
*Attorney, Agent, or Firm*—W. C. Mitchell; R. B. Olson; M. C. Sudol, Jr.

[57] ABSTRACT

The instant invention is directed to a process for the control of scale formation and deposition in thermal or reverse osmosis membrane desalination plants, comprising adding to the water 0.1 to 100 ppm of (a) a water soluble orthophosphate and (b) at least one compound selected from the group consisting of water soluble polycarboxylates, phosphonates, phosphates, sulfonates and polyamides.

13 Claims, No Drawings

ORTHOPHOSPHATE-CONTAINING DESALINATION SCALE INHIBITORS

BACKGROUND OF THE INVENTION

This is a continuation-in-part of U.S. Ser. No. 606,049, filed May 12, 1984, now abandoned.

A major operating problem in seawater distillation plants and reverse osmosis systems is the formation of calcium carbonate, magnesium hydroxide and calcium sulfate scales which reduce heat transfer, plug tubes and ultimately lower the rated capacity of a plant. In one study of fifty-five desalination plants around the world, scale buildup was the principal cause of reduced or lost production and plant shutdowns. From a design standpoint, the heat transfer surface area in a plant constitutes about 30% of the total cost, and the fouling tendency may require a 20 to 25% excess design allowance. This could represent 6% of the unit cost.

The effect of scale on heat transfer surfaces is equivalent to coating the surface with an effective insulating material. For example, a 5 mil (0.13 mm) thick calcium carbonate scale can reduce the heat transfer coefficient as much as 75%. Increased energy and maintenance costs, as well as plant shutdowns, are some of the economic penalties resulting from scale deposition in thermal desalination systems.

The two major methods of scale control currently practiced in thermal desalination plants to mitigate alkaine scale (calcium carbonate and magnesium hydroxide) are mineral acid neutralization of the seawater bicarbonate alkalinity with subsequent decarbonation, or the addition of formulated additives. The method used to prevent calcium sulfate scale is to control the temperature and brine concentration so that it stays below the supersaturated region for hemihydrate (Ca-SO$_4\frac{1}{2}$H$_2$O) formation.

Impurities in crystallization processes sometimes modify the shapes of crystals and/or retard their growth rates. These scale inhibitors are added to aqueous systems to either control the rate of crystallization or modify the morphology of the scale crystal.

Additives may act to stifle scale formation by one of several possible routes. They may change the chemical potential of the precipitating salt by affecting complex formation and adsorption. Additives may also form a film on the metal surface, thus eliminating potential adhering activation sites. They may adsorb onto the growing crystals, thus distorting and/or inhibiting further crystal formation; or they may adsorb onto the precipitating ions, thus inhibiting scale nucleation. It is likely that effective inhibitors function through more than one of the above routes.

"Threshold" inhibition is time related. Once supersaturation has occurred, precipitation is inevitable regardless of the presence of a threshold inhibitor. A threshold inhibitor can retard crystallization for a sufficiently long period of time such that the supersaturated solution is removed from the critical heat transfer surfaces of the system before crystallization begins. However, the period that such precipitation can be prevented is also a function of other factors, such as the degree of supersaturation. If precipitation occurs in the presence of a threshold inhibitor, because retention time is too great or a driving force is too great, the crystals which form are normally modified from their typical lattice structures. This modification can occur through the use of additives that are not particularly effective threshold scale inhibitors. Chelants and high molecular weight anionic polymers are examples of crystal modifiers.

U.S. Pat. No. 4,105,581 discloses the combination of polyphosphate or alkali metal phosphate, phosphonate and polymaleic acid as a corrosion inhibitor.

U.S. Pat. No. 3,992,318 discloses the combination of phosphonic acid, polyphosphate or alkali metal phosphate, and polyacrylic acid as a corrosion inhibitor.

Canadian Pat. No. 854,151 discloses the combination of organophosphonic acids and organic polymers as scale inhibitors.

U.S. Pat. No. 3,837,803 discloses the combination of organo-phosphonic acid and orthophosphate as a corrosion inhibitor.

PCT Published Patent Application No. PCT/US 82/00122 discloses the combination of an inorganic phosphate and acrylic acid/2-acrylamido-2-methyl propyl sulfonic acid copolymers as corrosion inhibitors.

DESCRIPTION OF THE INVENTION

The instant invention is directed to a process for the control of scale formation and deposition in thermal or reverse osmosis membrane desalination plants, comprising adding to the water 0.1 to 100 ppm of (a) a water soluble orthophosphate and (b) at least one compound selected from the group consisting of water soluble polycarboxylates, phosphonates, phosphates, sulfonates and polyamides.

The phrase "control of scale formation and deposition" is meant to include threshold inhibition, dispersion, solubilization, or particle size reduction.

The word "scale" is meant to include any of the scale-forming salts, including, but not limited to, calcium carbonate, calcium sulfate, calcium phosphate, calcium phosphonate (including calcium hydroxyethylidene diphosphonic acid), calcium oxalate, calcium fluoride, barium sulfate, magnesium salts and strontium salts.

The water-soluble orthophosphate compounds which are operable for the present purposes generally include phosphoric acid, the sodium orthophosphates, the potassium orthophosphates, the lithium orthophosphates and ammonium orthophosphates. The following specific compounds may be mentioned as exemplary: H$_3$PO$_4$ phosphoric acid, LiH$_2$PO$_4$ lithium di acid phosphate, Na$_3$PO$_4$ trisodium orthophosphate, Na$_2$HPO$_4$ disodium orthophosphate, NaH$_2$PO$_4$ monosodium orthophosphate, NaH$_5$(PO$_4$)$_2$ hemisodium orthophosphate, K$_3$PO$_4$ tripotassium orthophosphate, K$_2$HPO$_4$ dipotassium orthophosphate, KH$_2$PO$_4$ monopotassium orthophosphate, (NH$_4$)$_3$PO$_4$ triammonium orthophosphate, (NH$_4$)$_2$HPO$_4$ diammonium orthophosphate, and (NH$_4$)H$_2$PO$_4$ monoammonium orthophosphate.

In addition to the inorganic orthophosphates set forth above may be mentioned the organic orthophosphates which are set forth in U.S. Pat. No. 3,510,436. The specific compounds are those which possess the basic formula:

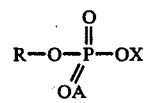

where R is an organic radical as described in the patent, X is A or R, and A is H, Na, Li, K or NH$_4$. Compounds of the above nature are an excellent source of orthophosphate.

Polyphosphates undergo some reversion so that in any system using polyphosphate there will exist some orthophosphate. However, in the instant invention it was found that by adding orthophosphate, threshold scale inhibition is significantly improved. Thus, the phrase "orthophosphate" as used in the instant application means a source of orthophosphate as set forth above, other than the reversion of polyphosphate.

Any water-soluble polycarboxylate may be used. Examples include polymers derived from homo- and/or copolymers (including terpolymers, tetra-, etc.) of acrylic acid, meythacrylic acid, vinyl acetic acid, allyl acetic acid, fumaric acid, phosphinocarboxylic acid, maleic acid or anhydride, itaconic acid, α-halo acrylic acid and β-carboxyethyl acrylate.

An water-soluble phosphonate may be used. Examples include 2-phosphono-1,2,4-tricarboxybutane, amino tri(methylene phosphonic acid), hydroxyethylidene diphosphonic acid, phosphonosuccinic acid, benzene phosphonic acid, 2-aminoethyl phosphonic acid, polyamino phosphonates and the like. Additional phosphonates are identified in U.S. Pat. No. 3,837,803, which is hereby incorporated by reference. The preferred phosphonates are 2-phosphono-1,2,4-tricarboxybutane, amino tri(methylene phosphonic acid) and hydroxyethylidene diphosphonic acid.

Any water-soluble phosphate may be used. Examples include condensed phosphates, such as sodium hexametaphosphate; phosphate esters; organophosphate esters, such as the lower alkyl group is selected from $C_1$ to $C_4$ and may be branched or unbranched. The alkyl group may be substituted with hydroxy, amino, halide, sulfate or sulfonate, alone or in combination; and molecularly dehydrated phosphates.

Any water-soluble sulfonate-containing polymer may be used. Examples include homo- and/or copolymers of 2-acrylamido-2-methylpropylsulfonic acid, 2-methacrylamido-2-methylpropylsulfonic acid, styrene sulfonic acid, vinyl sulfonic acid, sulfo alkyl acrylate or methacrylate, allyl or methallyl sulfonic acid, sulfonic acid acrylate, 3-methacrylamido-2-hydroxy propylsulfonic acid, their salts and mixtures thereof.

Any polyamide may be used. Examples include polyacrylamide and hydrolyzed polyacrylamide.

Any weight ratio of component (a) to component (b) may be used. The preferred ratio is 0.1:1 to 10:1, most preferably 2:1 to 10:1.

Calcium carbonate scale is a particular problem at a pH of 7 to 9. The admixtures of the instant invention were surprisingly found to be effective at a pH 7 to 9 and at temperatures ranging from 0° to 80° C. The admixtures of the instant invention are, of course, effective over a broad pH range (e.g. less than 7 and to some extent, greater than 9).

The admixture is used at a minimum dosage of 0.1 mg/l in inhibiting scale, preferably in a dosage of 1 to 100 mg/l, most preferably 1 to 15 mg/l.

It is preferred that component (b) have a weight average molecular weight of less than 25,000, preferably less than 15,000, most preferably less than 10,000, as determined by low angle laser light scattering.

The admixture was found to be synergistic in that the admixture inhibited scale to a greater extent than expected.

The scale inhibitor mixture may be added to the water at any point, preferably to the seawater makeup or to the recirculation brine. Components (a) and (b) may be added to the brine or they may be pre-mixed with mineral acid for a concurrent treatment approach whereby the seawater alkalinity is reduced by addition of stoichiometric amounts of acid in which the inhibitors are dissolved.

The scale inhibitor mixture may contain other additives, such as antifoams. Other scale and/or corrosion inhibitors, organic biocides, heat transfer enhancement surfactants and the like may also be used in addition to components (a) and (b).

The scale inhibitor mixture is effective at any pH. The pH in desalination systems, however, is generally about 6.5 to 9.5.

EXAMPLES

Steam was passed through a metal U tube to maintain the temperature at about 200° F. The U tube was immersed in a cylindrical cell. Seawater (pH 8.2±0.03) was passed through the cell at a rate of 11 to 12 1/16 hours. After 16 hours, the scale deposited on the U tube was removed, weighed and analyzed. The effectiveness is reported as % inhibition, defined by the equation:

$$\% \text{ inhibition} = \frac{\text{blank rate} - \text{inhibition rate}}{\text{blank rate}} \times 100.$$

The scaling rates were determined by the equation:

$$\text{scale rate} = \frac{\text{weight of scale on tube (mg)}}{\text{test volume throughput (l)}}$$

The % inhibition of various scale inhibitor mixtures is indicated in Tables I and II. The % inhibition of the individual components in Table II were interpolated from the data presented in the lower portion of Table II.

TABLE I

Conditions: 1.6X Synthetic Arabian Gulf Sea Water, Initial pH = 8.2 ± 0.03
11–12 liter throughput for 16 hours, T = 195 to 200° F.

| Component A | Active Conc., ppm | % inhibition | Component B | Active Conc., ppm | % inhibition | % Expected for A + B | % Actual for A + B | % Actual − % Expected[1] |
|---|---|---|---|---|---|---|---|---|
| PMA[2] | .126 | * | $PO_4^{-3}$ | .35 | 48 | 48 | 91 | 43 |
| PMA | .147 | * | $PO_4^{-3}$ | .41 | 48 | 48 | 81 | 33 |
| PMA | .168 | * | $PO_4^{-3}$ | .47 | 48 | 48 | 97 | 49 |

*The resulting deposit was greater than the deposit on the blank, thus inhibition was negative.
[1]Synergism is indicated as % Actual − % Expected is positive.
[2]PMA = polymaleic acid, MWT = 1300, as determined by light scattering. The formulation tested was made in the ratio 8.40% active PMA to 23.3% $PO_4^{-3}$.

TABLE II

| | | $o\text{-}PO_4^{-3}$ and AA/AMPS[1] | | |
|---|---|---|---|---|
| wt | Dosage, | $o\text{-}PO_4^{-3}$ | Active, ppm | % inhibition[2] |

TABLE II-continued o-$PO_4^{-3}$ and AA/AMPS[1]

| ratio | ppm | ppm | AA/AMPS | SHMP | P | A | A—P |
|---|---|---|---|---|---|---|---|
| 2.82:1 | 1.50 | 0.36 | 0.13 | — | 20 | 52 | 32 |
| 2.82:1 | 1.75 | 0.42 | 0.15 | — | 30 | 52 | 22 |
| 2.82:1 | 2.00 | 0.48 | 0.17 | — | 50 | 95 | 45 |
| 2.82:1 | 2.50 | 0.60 | 0.21 | — | 50 | 95 | 45 |
| 0.44:1 | 2.00 | 0.16 | 0.36 | 0.17 | 25 | 46 | 20 |
| 0.44:1 | 2.50 | 0.20 | 0.45 | 0.20 | 35 | 46 | 11 |
| 0.44:1 | 4.00 | 0.32 | 0.72 | 0.33 | 50 | 96 | 46 |

| | Active, ppm | % inhibition |
|---|---|---|
| o-$PO_4^{-3}$ | 0.25 | 0 |
| o-$PO_4^{-3}$ | 0.50 | 48 |
| o-$PO_4^{-3}$ | 1.00 | 97 |
| AA/AMPS | 0.14 | 0 |
| AA/AMPS | 0.28 | 22 |
| AA/AMPS | 0.84 | 39 |
| AA/AMPS | 1.68 | 95 |

[1]o-$PO_4^{-3}$ = ortho phosphate as $H_3PO_4$;
AA/AMPS = 60/40 *copolymer of acrylic acid and 2-acrylamido-2-methylpropyl sulfonic acid*,
MWT = *about 8200 as determined by low angle laser light scattering (AMPS is a registered trademark of The Lubrizol Corporation)*.
[2]P = predicted;
A = actual;
A-P = evidence of synergism

High Temperature Example

A synthetic sea water solution was prepared to be equivalent to Arabian Gulf sea water cycled up 1.6 times (NaCl, KCl, $NaSO_4$, $MgCl_2$ $6H_2O$ and $NaHCO_3$). Various amounts of inhibitor were added to samples of the solution as indicated in Table III. The pH was ad- justed to 9.00±0.05 by the addition of NaOH. The samples were placed in an autoclave for 5 hours at 200±2° F. A portion of each sample was removed and the mmoles of $CO_3$/l and $HCO_3$/l were determined. The % inhibition was determined by the following equation:

$$\% \text{ inhibition} = 100 \times \frac{\text{total mmoles in sample} - \text{total mmoles in blank}}{\text{total mmoles in stock solution} - \text{total mmoles in blank}}$$

The results are reported in Table III.

TABLE III

Results from Autoclave Test for $CaCO_3$ Inhibition in Concentrated Synthetic Brine At High Temperature Conditions
1.6X Arabian Gulf Sea Water, 5.0 hours at 200° F., initial pH = 9.0

| Component A | Active Concentration (ppm) | A Alone % Inhibition | Component B | Active Concentration (ppm) | B Alone % Inhibition | % Expected A + B | % Actual A + B | Actual % − Expected % |
|---|---|---|---|---|---|---|---|---|
| PMA[1] | .252 | −10 | $PO_4^{-3}$ | .70 | 56 | 46 | 81 | 35 |
| PMA | .336 | −6 | $PO_4^{-3}$ | .93 | 66 | 60 | 90 | 30 |
| PAA | .252 | 3 | $PO_4^{-3}$ | .70 | 56 | 59 | 93 | 34 |
| PAA | .168 | −3 | $PO_4^{-3}$ | .47 | 5 | 2 | 86 | 84 |
| AA/AMPS[2] (60/40) | .252 | 0 | $PO_4^{-3}$ | .70 | 56 | 56 | 88 | 32 |
| HEDP[3] | .168 | −7 | $PO_4^{-3}$ | .47 | 5 | −2 | 73 | 71 |
| HEDP | .252 | −3 | $PO_4^{-3}$ | .70 | 56 | 53 | 100 | 47 |
| HEDP | .336 | −3 | $PO_4^{-3}$ | .93 | 66 | 63 | 97 | 33 |
| AA/AMPS (98/2) | .25 | 6 | $PO_4^{-3}$ | .75 | 26 | 32 | 98 | 66 |
| AA/AMPS (90/10) | .25 | 20 | $PO_4^{-3}$ | .75 | 26 | 46 | 96 | 50 |
| AA/AMPS (80/20) | .25 | 9 | $PO_4^{-3}$ | .75 | 26 | 35 | 78 | 43 |
| AA/AMPS (60/40) (high viscosity)[4] | .25 | 9 | $PO_4^{-3}$ | .75 | 26 | 35 | 99 | 64 |
| AA/AMPS (60/40) | .25 | 11 | $PO_4^{-3}$ | .75 | 26 | 37 | 94 | 57 |
| AA/AMPS (60/40) (low viscosity)[5] | .25 | 15 | $PO_4^{-3}$ | .75 | 26 | 41 | 86 | 45 |
| MAA/AMPS (40/60)[6] | .25 | 5 | $PO_4^{-3}$ | .75 | 26 | 31 | 76 | 45 |
| AA/AMPS (25/75) | .25 | 8 | $PO_4^{-3}$ | .75 | 26 | 34 | 53 | 19 |
| AA/AMPS (10/90) | .25 | 2 | $PO_4^{-3}$ | .75 | 26 | 28 | 88 | 60 |
| AA/AMPS (5/95) | .25 | 3 | $PO_4^{-3}$ | .75 | 26 | 29 | 48 | 19 |
| AA/AMPS (2/98) | .25 | 4 | $PO_4^{-3}$ | .75 | 26 | 30 | 27 | −3 |
| PBSAM[7] | .25 | 7 | $PO_4^{-3}$ | .75 | 26 | 33 | 65 | 32 |
| AA/HPA[8] | .25 | 21 | $PO_4^{-3}$ | .75 | 26 | 47 | 65 | 18 |
| AA/AMPS/HEM 5 (70/20/10)[9] | .25 | 11 | $PO_4^{-3}$ | .75 | 26 | 37 | 62 | 25 |
| MAA/AMPS | .25 | 4 | $PO_4^{-3}$ | .75 | 26 | 30 | 99 | 69 |

Synergism is indicated when Actual % − Expected % is positive.
[1]PMA = polymaleic acid, MWT = 1300, as determined by light scattering.
[2]AA/AMPS = acrylic acid/2-acrylamido-2-methylpropyl sulfonic acid copolymer, MWT = about 8200 as determined by light scattering unless otherwise indicated; mole ratio AA/AMPS is listed parenthetically.
[3]HEDP = hydroxyethylidene diphosphonic acid.
[4]AA/AMPS (high viscosity) = 60/40 acrylic acid/2-acrylamido-2-methylpropyl sulfonic acid copolymer, MWT = about 66,000 as determined by light scattering.
[5]AA/AMPS (low viscosity) = 60/40 acrylic acid/2-acrylamido-2-methylpropyl sulfonic acid copolymer, MWT = about 4900 as determined by light scattering.
[6]MAA/AMPS = methacrylic acid/2-acrylamido-2-methylpropyl sulfonic acid copolymer, MWT = about 5000, available from Dearborn Chemical Co. as Endcor 4623.
[7]PBSAM AM = 2-phosphino-1,2,4 tricarboxy butane, available from Mobay Chemical Company as Bayhibit AM.
[8]AA/HPA = 60/40 acrylic acid/hydroxypropyl acrylate copolymer, MWT = about 3500, available from Betz Laboratories, Inc. as Betz 2020.
[9]AA/AMPS/HEM 5 = acrylic acid/2-acrylamido-2-2 methylpropyl sulfonic acid/polyethylene glycol mono methacrylate polymer, MWT = about 4200, having a weight ratio of about 70/20/10, available from Calgon Corporation, Pittsburgh, PA.

Reverse Osmosis Example

Reverse osmosis is a method of purifying saline or brackish water by separating ions from water, under pressure, through a semi-permeable membrane material such as cellulose acetate.

The membrane disc test unit used, which simulates RO processes used in the field, recirculates a brine water under pressure past an RO membrane. This causes cycling up of the water because, though most of the brine simply goes past the membrane, a small percentage of pure water comes through the membrane. As the remaining brine concentrates, the calcium, magnesium, sulfate or bicarbonate ion concentrations will increase until the point of precipitation.

Precipitation on reverse osmosis membranes can cause loss of flow and diminution of ion rejecting capabilities. Antiscalants can increase the solubility of dissolved calcium and inhibit scale formation. Therefore, bicarbonate and calcium ion concentrations were monitored during the test.

The system used comprises a holding tank, displacement pump, air pressure tank to apply pressure using a diaphram-containing flow controller, rotometer and calcium samples. This type of system is fully described in Reddy, Glater and McCutchan, *National Water Supply Improvement Association Journal*, 3, 12 (1976).

Simulated Roswell water contains the folowing ions:

| Species | Concentration (mg/l) |
|---------|---------------------|
| Ca | 816 |
| Mg | 263 |
| Na | 1038 |
| Cl | 2446 |
| $SO_4$ | 1716 |
| $HCO_3$ | 216 |
| $pH^3$ | 7.7–7.8 |

Inhibitor was added to 5000 ml of simulated Roswell water. Initial Ca and $HCO_3$ values were checked using titration. The recirculating RO system was then set at 400 psi with a brine flow of 600 ml/minute, and the system was cycled up to a desired percent recovery level (% of total feedwater converted into fresh water). Results are shown in Table IV, below:

TABLE IV

| RO Tests: Maximum $HCO_3$ Obtained (mg/L) | | | | |
|---|---|---|---|---|
| | Dosage (mg/L) | Maximum | Initial | Increase |
| AA/AMPS | 1.68 | 288 | 229 | 59 |
| $PO_4^{-3}$ | 5.0 | 284 | 229 | 55 |
| AA/AMPS + $PO_4^{-3}$ | 1.68/5.0 | 350 | 229 | 121 |
| AA/AMPS | 1.68 | 277 | 213 | 64 |
| $PO_4^{-3}$ + HEDP | 4.64/1.02 | 235 | 213 | 22 |
| AA/AMPS + $PO_4^{-3}$ + HEDP | 1.68/4.64/1.02 | 280 | 213 | 67 |

AA/AMPS = acrylic acid/2-acrylamido-2-methylpropyl sulfonic acid copolymer, MWT = about 8200 as determined by light scattering; AA/AMPS mole ratio is 60/40
$PO_4^{-3}$ = orthophosphate as $H_3PO_4$
HEDP = hydroxyethylidene diphosphonic acid

What is claimed is:

1. A process for controlling the formation and deposition of seawater scale, including calcium carbonate, on heat transfer surfaces contacting seawater at a temperature of at least about 200° F. in thermal desalination plants, comprising adding to said seawater 0.1 to 100 ppm of (a) a water soluble source of orthophosphate selected from the group consisting of phosphoric acid, sodium orthophosphates, potassium orthophosphates, lithium orthophosphates and ammonium orthophosphates and (b) at least one water soluble component selected from the group consisting of:

(1) polymers of maleic acid or anhydride having a weight average molecular weight of less than 25,000;

(2) phosphonates selected from the group consisting of hydroxyethylidene diphosphonic acid and 2-phosphino-1,2,4-tricarboxybutane;

(3) polymers comprising:
  (i) acrylic acid or methacrylic acid and
  (ii) 2-acrylamido-2-methylpropyl sulfonic acid or 2-methacrylamido-2-methylpropyl sulfonic acid,
wherein said polymers comprising (i) and (ii) have a weight average molecular weight of less than about 66,000, and wherein the mole ratio of (i):(ii) ranges from about 98:2 to about 10:90; and (4) polyacrylic acids having a weight average molecular weight of less than about 25,000;

wherein the weight ratio of component (a):component (b) ranges from about 0.1:1 to about 10:1 and wherein the pH of said water to be desalinated ranges from about 6.5 to about 9.5.

2. The process of claim 1, wherein the weight ratio of (a) to (b) is 2:1 to 10:1.

3. The process of claim 1, wherein (b) is a polymer of maleic acid or anhydride having a weight average molecular weight of less than 25,000.

4. The process of claim 1, wherein (b) is a phosphonate selected from the group consisting of hydroxyethylidene diphosphonic acid and 2-phosphino-1,2,4-tricarboxybutane.

5. The method of claim 1, wherein (b) is selected from the group of polymers consisting of polymers of
  (i) acrylic acid or methacrylic acid and
  (ii) 2-acrylamido-2-methylpropyl sulfonic acid or 2-methacrylamido-2-methylpropyl sulfonic acid,
wherein said polymers comprising (i) and (ii) have a weight average molecular weight of less than about 66,000 and wherein the mole ratio of (i):(ii) ranges from about 98:2 to about 10:90.

6. The method of claim 5, wherein (i) is acrylic acid and (ii) is 2-acrylamido-2-methylpropyl sulfonic acid.

7. The method of claim 6, wherein said weight average molecular weight is less than about 25,000.

8. The method of claim 6 wherein said mole ratio of (i):(ii) is about 60:40.

9. The method of claim 5, wherein (i) is methacrylic acid and (ii) is 2-acrylamido-2-methylpropyl sulfonic acid.

10. The method of claim 9, wherein said weight average molecular weight is less than about 25,000.

11. The method of claim 9 wherein said mole ratio of (i):(ii) is about 60:40.

12. The method of claim 5, wherein said mole ratio of (i):(ii) is about 60:40.

13. The method of claim 1, wherein (b) is polyacrylic acid having a weight average molecular weight of less than about 25,000.

* * * * *